United States Patent
Su

(10) Patent No.: US 8,300,146 B2
(45) Date of Patent: Oct. 30, 2012

(54) DISPLAY FREQUENCY BOOSTING SYSTEM FOR INCREASING IMAGE DISPLAY FREQUENCY

(75) Inventor: Te-Sung Su, Zhubei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 302 days.

(21) Appl. No.: 12/662,665

(22) Filed: Apr. 28, 2010

(65) Prior Publication Data

US 2010/0277643 A1 Nov. 4, 2010

(30) Foreign Application Priority Data

Apr. 29, 2009 (TW) .............................. 98114166 A

(51) Int. Cl.
*H04N 7/01* (2006.01)
(52) U.S. Cl. ..................................................... 348/452
(58) Field of Classification Search .......... 348/700–702, 348/441, 448, 451–452, 458, 699
See application file for complete search history.

(56) References Cited

U.S. PATENT DOCUMENTS

| 6,636,267 | B1* | 10/2003 | Adachi | 348/448 |
| 6,930,728 | B2* | 8/2005 | Rhee | 348/448 |
| 6,992,725 | B2* | 1/2006 | Mohsenian | 348/448 |
| 7,057,665 | B2* | 6/2006 | Jung et al. | 348/452 |
| 8,125,565 | B2* | 2/2012 | Chen et al. | 348/452 |
| 2008/0260021 | A1* | 10/2008 | Sung | 375/240.01 |
| 2010/0201888 | A1* | 8/2010 | Peng et al. | 348/699 |
| 2010/0283897 | A1* | 11/2010 | Peng et al. | 348/452 |

* cited by examiner

*Primary Examiner* — Paulos Natnael
(74) *Attorney, Agent, or Firm* — Bacon & Thomas, PLLC

(57) ABSTRACT

A display frequency boosting system for increasing image display frequency includes a buffer to receive a first frame, a second frame, and a third frame of image data and store the frames in a form of zero to fifth fields, a motion estimation device to perform a motion estimation on the fields to produce a motion vector, an interpolator connected to the buffer to perform an interpolation on the fields to produce an interpolated field, a motion compensation device to perform a motion compensation according to the motion vector, the fields and the interpolated field to produce sixth and seventh fields, and a controller to control read and write operations of the buffer, wherein each frame is composed of an odd field and an even field, and a fourth frame corresponding to the sixth and the seventh fields locates between the first and second frames in a display time axis.

11 Claims, 11 Drawing Sheets

DISPLAY FREQUENCY BOOSTING SYSTEM FOR INCREASING IMAGE DISPLAY FREQUENCY

BACKGROUND OF THE INVENTION

1. Field of the Invention

The present invention relates to the technical field of image processing and, more particularly, to a display frequency boosting system for increasing image display frequency.

2. Description of Related Art

Frame Rate Up-Conversion (FRC) is newly developed to essentially increase a video frame rate to meet the requirement of a high quality television with, for example, a 60 Hz or higher frame rate. A video with a higher frame rate such as 60 frames/sec can be obtained by interpolating frames into a video source with a frame rate such as 30 frames/sec.

In such a method of interpolating frames, it is assumed that a frame (referring to as $F_{in}$) is interpolated between the n-th frame $F_n$ and the (n+1)-th frame $F_{n+1}$. Accordingly, a frame repetition is provided, as shown in FIG. 1 in which the frame $F_n$ is repeated twice to thereby replace the frame $F_{in}$. However, such a way is simple but effects poorly, for an image stop effect can be easily caused.

To overcome this problem, a frame averaging is provided, as shown in FIG. 2 in which the corresponding pixels between the frames $F_n$ and $F_{n+1}$ are averaged and filled at corresponding pixels of the frame $F_{in}$. The equation can be expressed as: Pixel(x, y, $F_{in}$)=[Pixel(x, y, $F_n$)+Pixel(x, y, $F_{n+1}$)]/2. However, since the corresponding pixels between the frames $F_n$ and $F_{n+1}$ are averaged, the moving object on the frame $F_{in}$ easily presents a blur effect.

Another FRC technique is a motion compensated frame interpolation, which regards motion traces of all objects in a very short time between the frames as a linear motion. As shown in FIG. 3, it uses a motion estimation to calculate a motion vector between the frames $F_n$ and $F_{n+1}$, and then re-builds the frame $F_{in}$ based on the motion vector. As for re-building the frame $F_{in}$, it requires the frames $F_n$ and $F_{n+1}$, which are stored in a frame buffer as recited in the prior art. FIG. 4 is a schematic diagram of frame buffers used in the prior art. FIG. 5 is a schematic diagram of using frame buffers in the prior art. As shown in FIG. 4, for increasing the system performance, three frame buffers are used. When the frames $F_n$ and $F_{n+1}$ are read from the buffers 0 and 1 to re-build the frame $F_{in}$, the frame $F_{n+2}$ is written in the frame buffer 2. As shown in FIG. 5, at time Ta, the frame $F_{n+2}$ starts to be written in the frame buffer 2, and the frame $F_n$ is read from the frame buffer 0 to display. At time Tb, the frame $F_{n+2}$ keeps being written in the frame buffer 2, and the frames $F_n$ and $F_{n+1}$ are read respectively from the buffers 0 and 1 to re-build, output and display the frame $F_{in}$. At time Tc, since the frame $F_n$ is displayed and not used, the frame $F_{n+3}$ starts to be written in the frame buffer 0, and the frame $F_{n+1}$ is read from the frame buffer 1 to display. The subsequent operation is similar to the above and thus a detailed description is deemed unnecessary. It is known in FIGS. 4 and 5 that the frames $F_n$ and $F_{n+1}$ are read for re-building the frame $F_{in}$ base on at least three buffers which may increase the system cost and reduces the system efficiency.

Therefore, it is desirable to provide an improved display frequency boosting system to mitigate and/or obviate the aforementioned problems.

SUMMARY OF THE INVENTION

The object of the present invention is to provide a display frequency boosting system for increasing image display frequency, which can reduce the number of frame buffers by 0.5 frame buffer in comparison with the prior art to thereby lower the cost, and also reduce the system reading bandwidth to decrease the system load.

According to a feature of the invention, a display frequency boosting system for increasing image display frequency is provided, which includes a buffer, a motion estimation device, an interpolator, a motion compensation device and a controller. The buffer has an input terminal and six field buffers to receive image data of a first frame, a second frame and a third frame and store the frames in a form of zero to fifth fields, wherein each of the frames is composed of an odd field and an even field. The motion estimation device is connected to the buffer in order to perform a motion estimation on the fields to thereby produce a motion vector. The interpolator is connected to the buffer in order to perform an interpolation on the fields to thereby produce an interpolated field. The motion compensation device is connected to the buffer, the motion estimation device and the interpolator in order to perform a motion compensation according to the fields stored in the buffer, the interpolated field and the motion vector to thereby produce a sixth field and a seventh field. The controller is connected to the buffer in order to control read and write operations of the buffer. A fourth frame corresponding to the sixth field and the seventh field locates between the first frame and the second frame in a display time axis.

According to another feature of the invention, a display frequency boosting system for increasing image display frequency is provided, which includes a buffer, a motion estimation device, an interpolator, a motion compensation device and a controller. The buffer has an input terminal and ten half field buffers to receive image data of first to third frames and store the frames in a form of zero to fourth fields, wherein each of the frames is composed of an odd field and an even field, and each field is composed of a first half field and a second half field. The motion estimation device is connected to the buffer in order to perform a motion estimation on the fields to thereby produce a motion vector. The interpolator is connected to the buffer in order to perform an interpolation on the fields to thereby produce an interpolated field. The motion compensation device is connected to the buffer, the motion estimation device and the interpolator in order to perform a motion compensation according to the fields stored in the buffer, the interpolated field and the motion vector to thereby produce a sixth field and a seventh field. The controller is connected to the buffer in order to control read and write operations of the buffer. A fourth frame corresponding to the sixth field and the seventh field locates between the first frame and the second frame in a display time axis.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
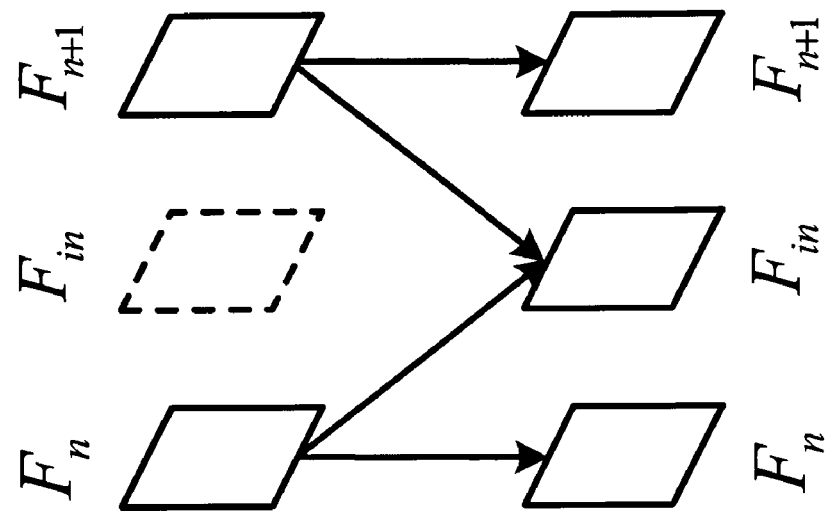
FIG. 2 is a schematic diagram of averaging the corresponding pixels of two successive frames $F_n$ and $F_{n+1}$ in the prior art.
Figure 1:
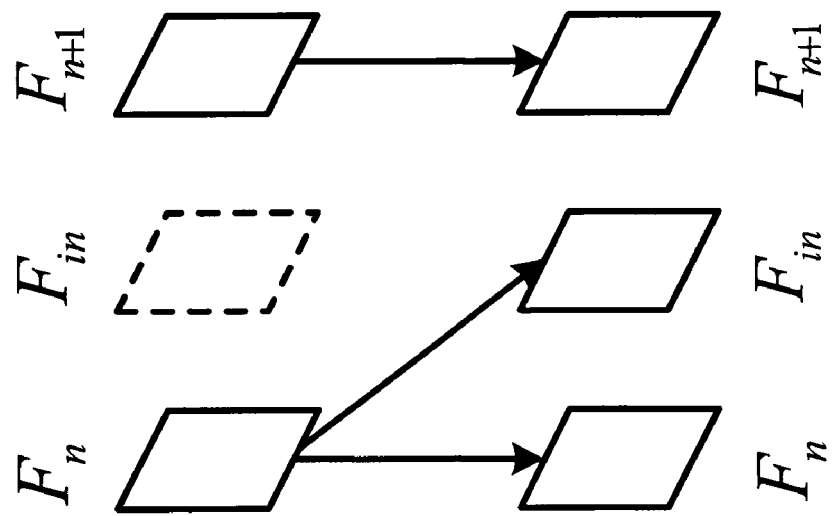
FIG. 1 is a schematic diagram of repeatedly playing a frame in the prior art.
Figure 3:
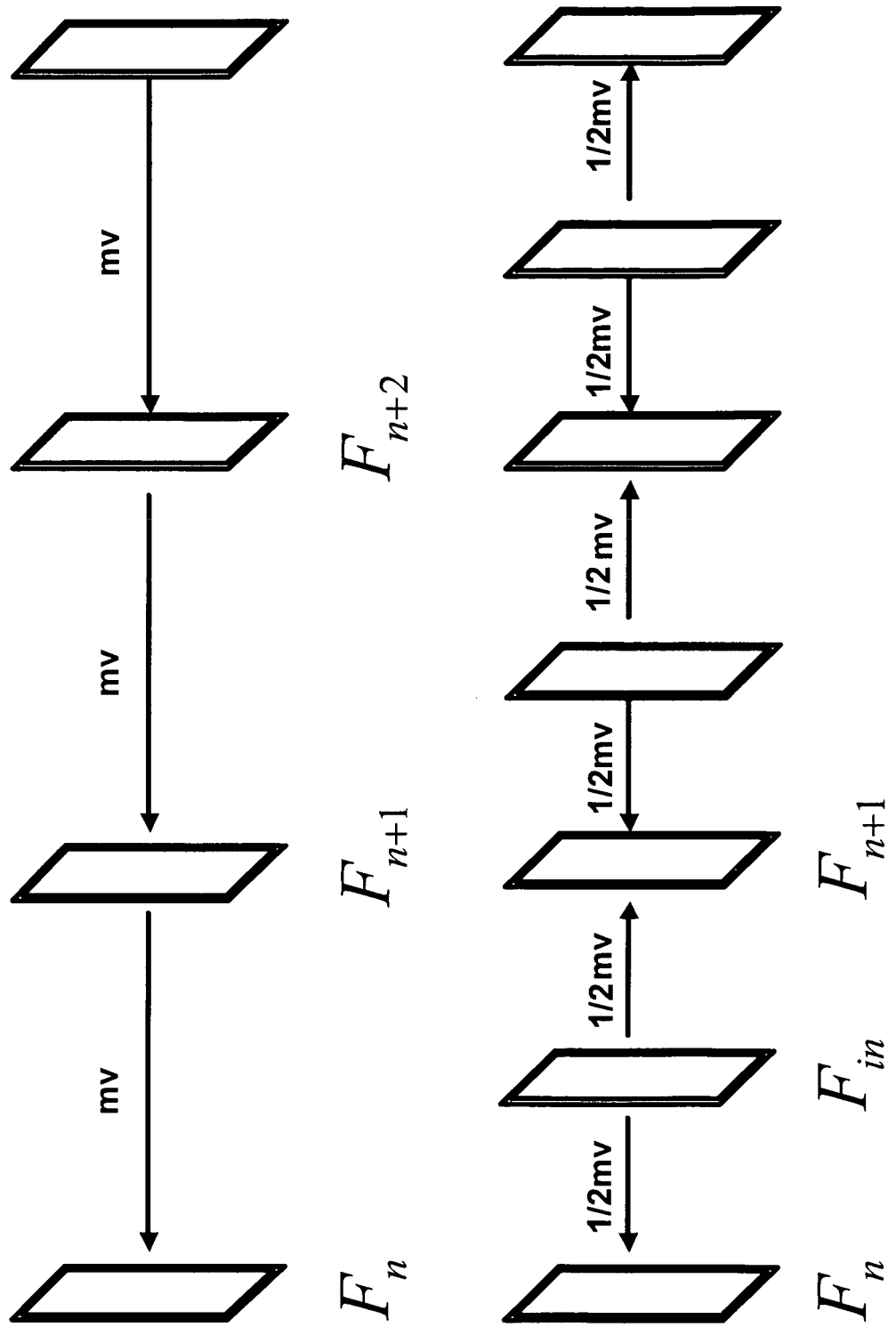
FIG. 3 is a schematic diagram of a typical motion estimation.
Figure 4:
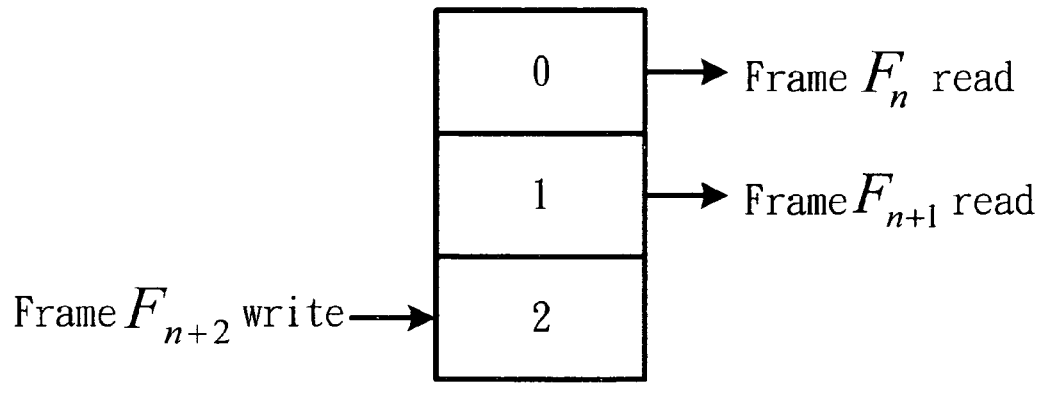
FIG. 4 is a schematic diagram of frame buffers used in the prior art.
Figure 5:
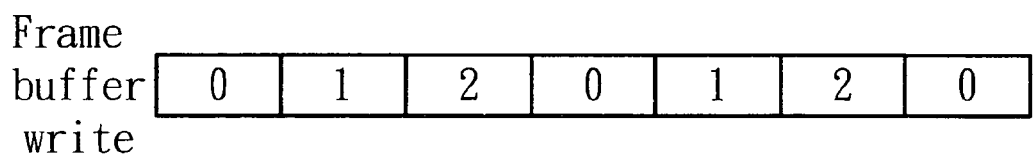
FIG. 5 is a schematic diagram of using frame buffers in the prior art.
Figure 5:
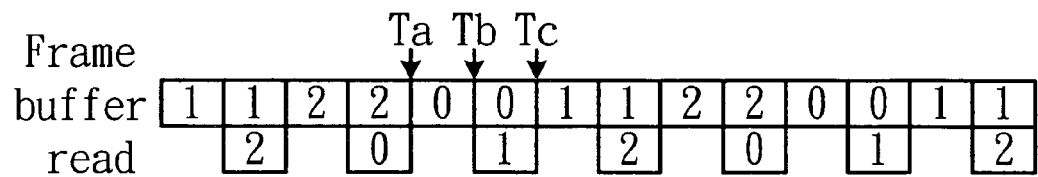
Figure 6:
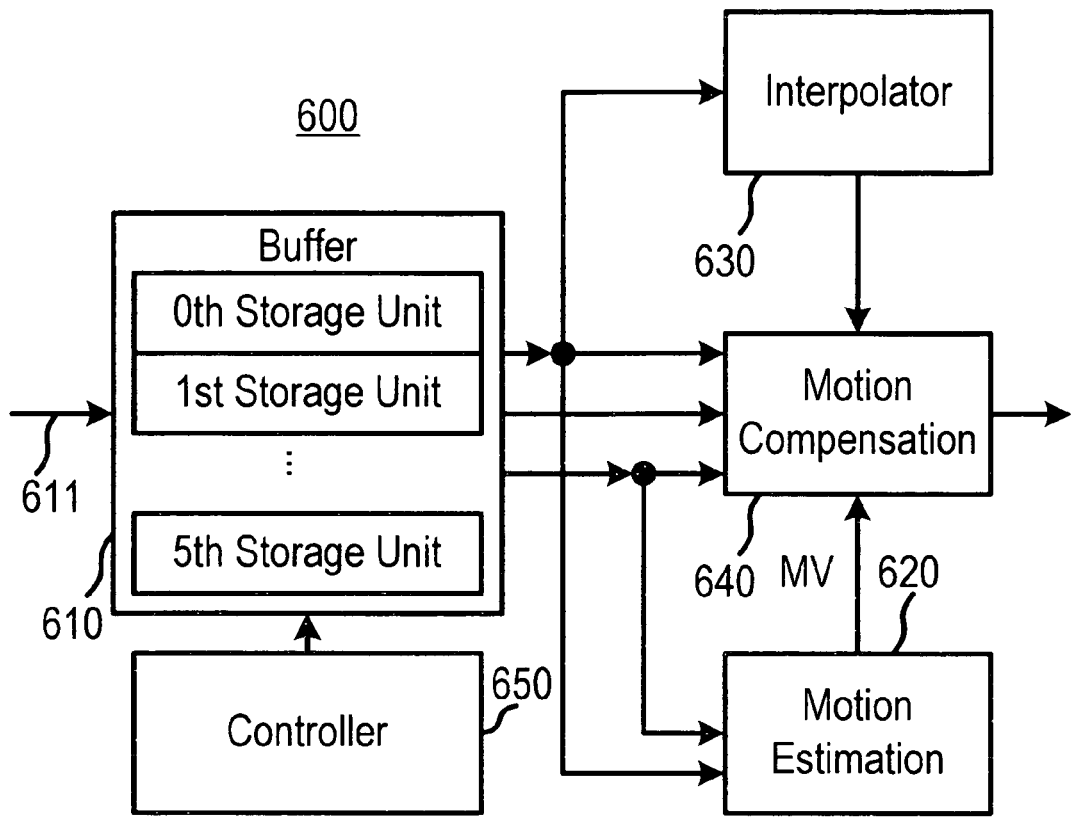
FIG. 6 is a block diagram of a display frequency boosting system for increasing image display frequency according to an embodiment of the invention.

FIG. 6 is a block diagram of a display frequency boosting system 600 for increasing image display frequency according to an embodiment of the invention. In FIG. 6, the boosting system 600 includes a buffer 610, a motion estimation device 620, an interpolator 630, a motion compensation device 640 and a controller 650.

The buffer 610 has an input terminal 611 and six storage units, denoted as zero to fifth storage units, wherein each storage unit is a field buffer. The buffer 610 receives image data of a first frame, a second frame and a third frame, and each frame is composed of an odd field and an even field. Accordingly, the buffer 610 stores the frames in a form of zero to fifth fields.

The motion estimation device 620 is connected to the buffer 610 in order to perform a motion estimation on the fields to thereby produce a motion vector MV. Instead of performing motion estimation by means of two successive frames $F_n$ and $F_{n+1}$ in the prior art, the invention performs motion estimation by means of the corresponding fields in two successive frames such as even or odd fields in the frames $F_n$ and $F_{n+1}$.

The interpolator 630 is connected to the buffer 610 in order to perform an interpolation on the fields to thereby produce an interpolated field.

The motion compensation device 640 is connected to the buffer 610, the motion estimation device 620 and the interpolator 630 in order to perform a motion compensation according to the fields stored in the buffer 610, the interpolated field and the motion vector to thereby produce a sixth field and a seventh field.

The controller 650 is connected to the buffer 610 in order to control read and write operations of the buffer 610, wherein a fourth frame corresponding to the sixth field and the seventh field locates between the first frame and the second frame in a display time axis.

Figure 7:
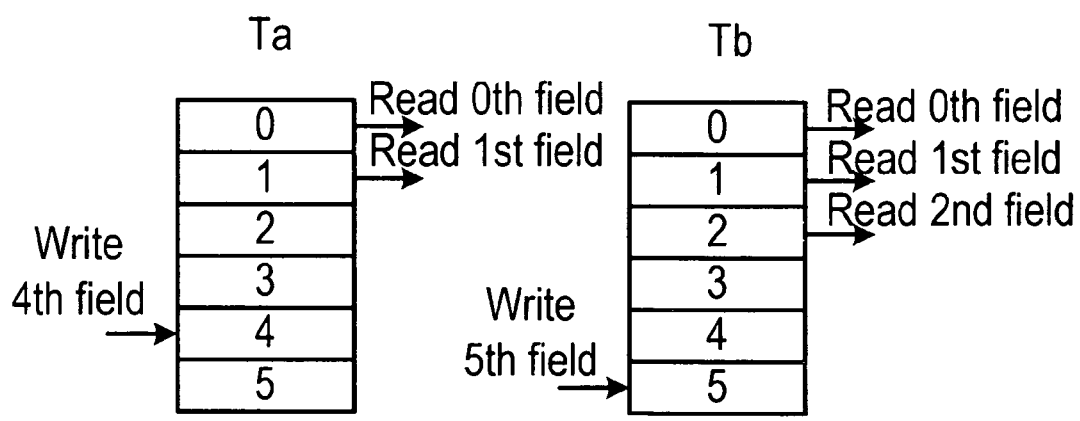
FIG. 7 is a schematic diagram of a buffer operating in different time intervals according to an embodiment of the invention.
Figure 8:
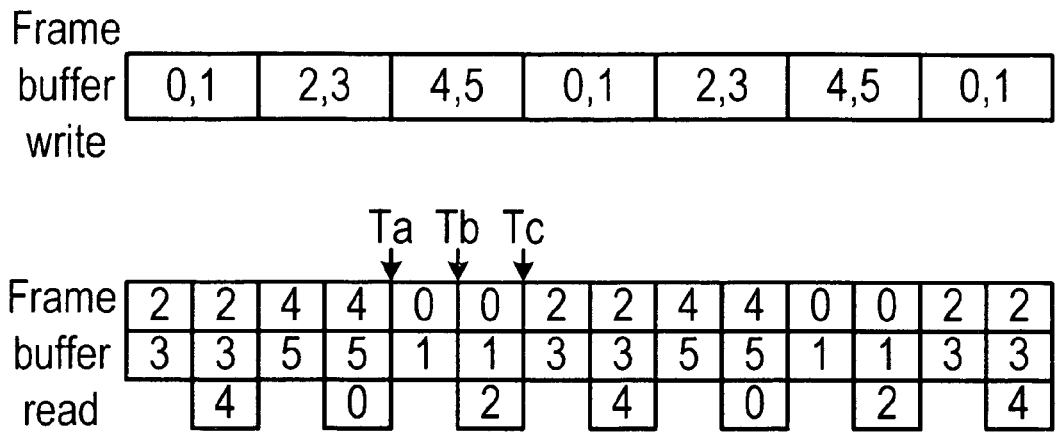
FIG. 8 schematically illustrates a timing of a display frequency boosting system for increasing image display frequency according to an embodiment of the invention.
Figure 9:
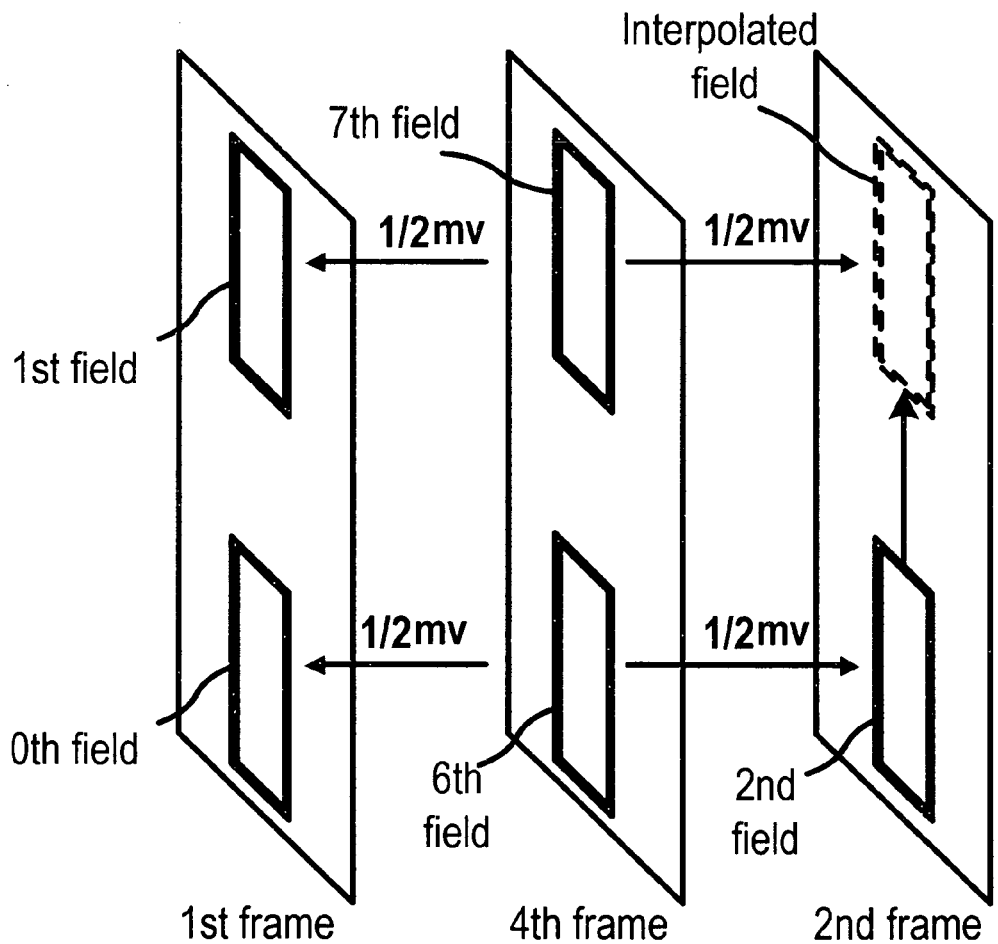
FIG. 9 schematically illustrates the operation of a display frequency boosting system for increasing image display frequency according to an embodiment of the invention.

FIG. 7 is a schematic diagram of the buffer 610 operating in different time intervals according to an embodiment of the invention. FIG. 8 schematically illustrates a timing of the display frequency boosting system 600 for increasing image display frequency according to an embodiment of the invention. FIG. 9 schematically illustrates the operation of the display frequency boosting system 600 for increasing image display frequency according to an embodiment of the invention. As shown in FIGS. 7 to 9, in a first time interval Ta, the controller 650 controls the buffer 610 in order to write the fourth field in the buffer 610, read the zero field and the first field out of the buffer 610, and output the first frame corresponding to the zero field and the first field.

In a second time interval Tb, the controller 650 controls the buffer 610 in order to write the fifth field in the buffer 610, and read the zero field, the first field and the second field out of the buffer 610.

In the second time interval Tb, the motion estimation device 620 performs a motion estimation on the zero field and the second field to thereby produce the motion vector MV, and the interpolator 630 performs an interpolation on the second field to thereby produce the interpolated field.

In the second time interval Tb, the motion compensation device 640 is based on the motion vector MV, the zero field and the second field to perform a motion compensation to thereby produce the sixth field, and is based on the motion vector MV, the first field and the interpolated field to perform the motion compensation to thereby produce the seventh field.

Accordingly, in the invention, in the second time interval Tb, only 3 fields, i.e. 1.5 frames, should be read out of the buffer 610, but in the prior art, 2 frames should be read out of the buffer. Thus, with the invention, the system reading requirement and the system load are reduced.

Figures 10, 11:
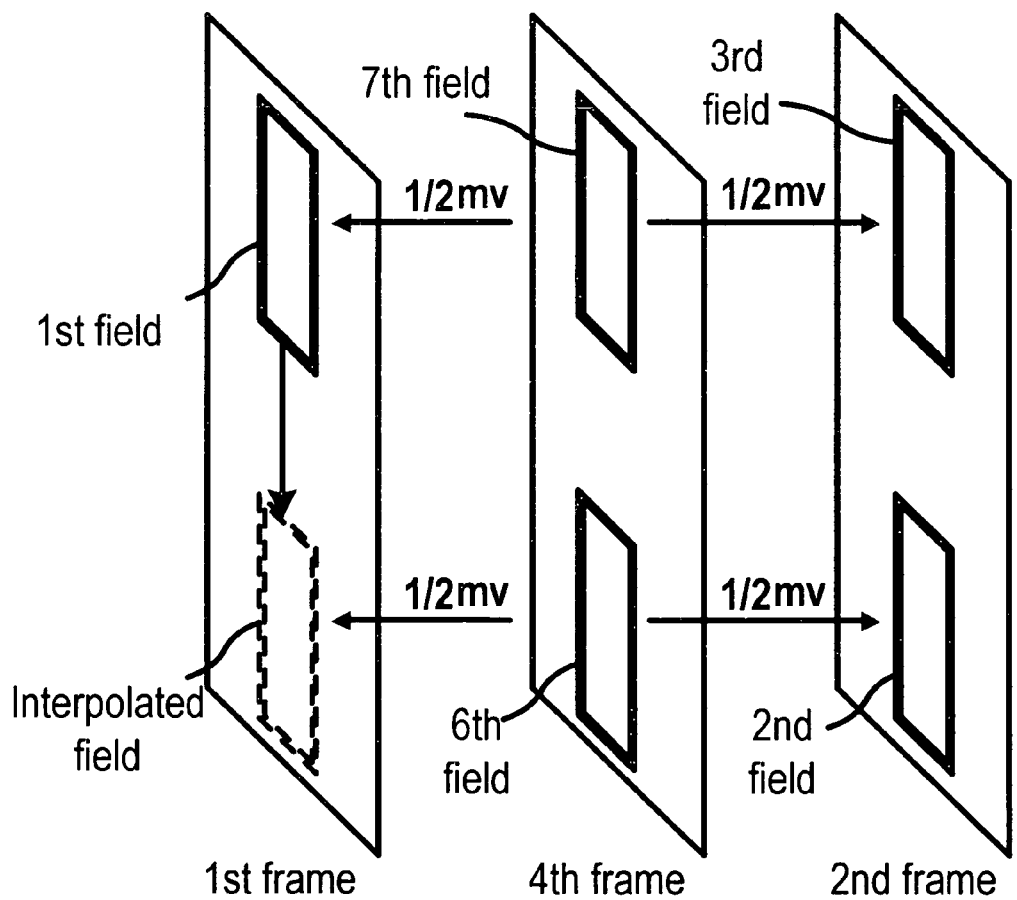
FIG. 10 schematically illustrates a timing of a display frequency boosting system for increasing image display frequency according to another embodiment of the invention.
FIG. 11 schematically illustrates the operation of a display frequency boosting system for increasing image display frequency according to another embodiment of the invention.

FIG. 10 schematically illustrates a timing of the display frequency boosting system 600 for increasing image display frequency according to another embodiment of the invention. FIG. 11 schematically illustrates the operation of the display frequency boosting system 600 for increasing image display frequency according to another embodiment of the invention. In the second time interval Tb, the controller 650 controls the buffer 610 in order to write the fifth field in the buffer 610, and read the first field, the second field and the third field out of the buffer 610.

In the second time interval Tb, the motion estimation device 620 performs a motion estimation on the first field and the third field to thereby produce the motion vector MV, the interpolator 630 performs an Interpolation on the first field to thereby produce the interpolated field, the motion compensation device 640 is based on the motion vector MV, the interpolated field and the second field to perform a motion compensation to thereby produce the sixth field, and is based on the motion vector MV, the first field and the third field to perform the motion compensation to thereby produce the seventh field.

Figures 12, 13:
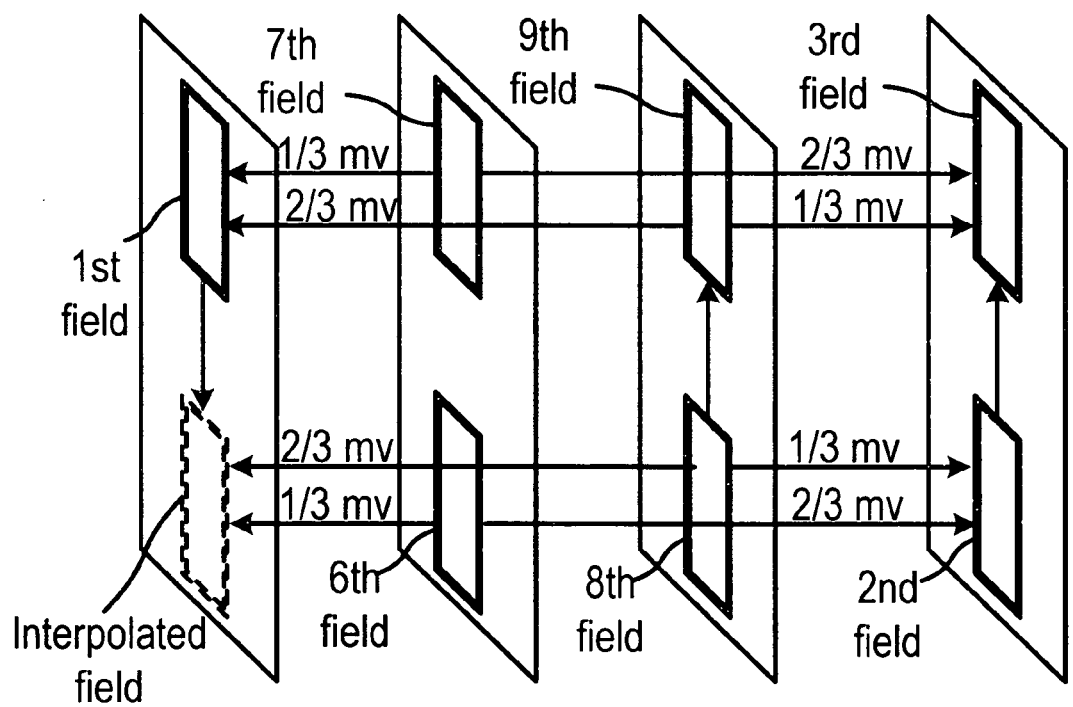
FIG. 12 schematically illustrates a timing of a display frequency boosting system for increasing image display frequency according to a further embodiment of the invention.
FIG. 13 schematically illustrates the operation of a display frequency boosting system for increasing image display frequency according to a further embodiment of the invention.

FIG. 12 schematically illustrates a timing of the display frequency boosting system 600 for increasing image display frequency according to a further embodiment of the invention. FIG. 13 schematically illustrates the operation of the display frequency boosting system 600 for increasing image display frequency according to a further embodiment of the invention. As shown in FIGS. 12 and 13, the image display rate is increased triple. Accordingly, in the second time interval Tb, the controller 650 controls the buffer 610 in order to write the fifth field in the buffer 610 and read the first field, the second field and the third field out of the buffer 610.

In the second time interval Tb, the motion estimation device 620 performs a motion estimation on the first field and the third field to thereby produce the motion vector MV, the interpolator 630 performs an interpolation on the first field to thereby produce the interpolated field, and the motion compensation device 640 is based on the motion vector MV, the interpolated field and the second field to perform a motion compensation to thereby produce the sixth field, and is based on the motion vector MV, the first field and the third field to perform the motion compensation to thereby produce the seventh field.

In the third time interval Tc, the motion estimation device 620 performs a motion estimation on the first field and the third field to thereby produce the motion vector MV, the interpolator 630 performs an interpolation on the first field to thereby produce the interpolated field, and the motion compensation device 640 is based on the motion vector MV, the interpolated field and the second field to perform a motion compensation to thereby produce the eighth field, and is based on the motion vector MV, the first field and the third field to perform the motion compensation to thereby produce the ninth field.

Figure 14:
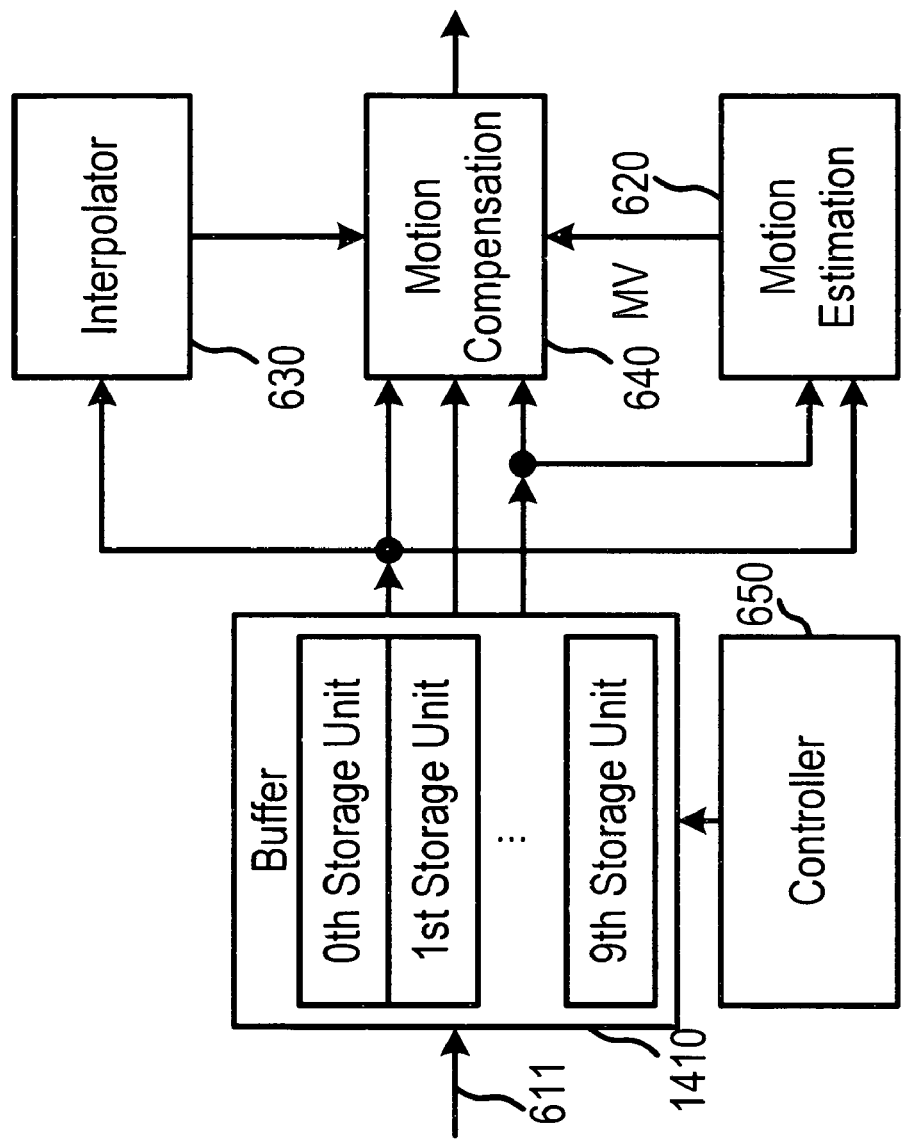
FIG. 14 is a block diagram of a display frequency boosting system for increasing image display frequency according to another embodiment of the invention.

FIG. 14 is a block diagram of a display frequency boosting system 600 for increasing image display frequency according to another embodiment of the invention. In FIG. 14, the boosting system 600 includes a buffer 1410, a motion estimation device 620, an interpolator 630, a motion compensation device 640 and a controller 650. This embodiment is different from that of FIG. 6 in that the buffer 1410 has an input terminal and ten storage units, denoted as zero to ninth storage units, in order to receive and store image data of a first frame and a second frame and partial image data of a third frame, which are stored as zero to fourth fields. The storage units are half field buffers. Each frame is composed of an odd field and an even field, and each field is composed of a first half field and a second half field. Namely, the buffer 1410 has ten half field buffers, which are equivalent to five field buffers or 2.5 frame buffers.

Figure 15:
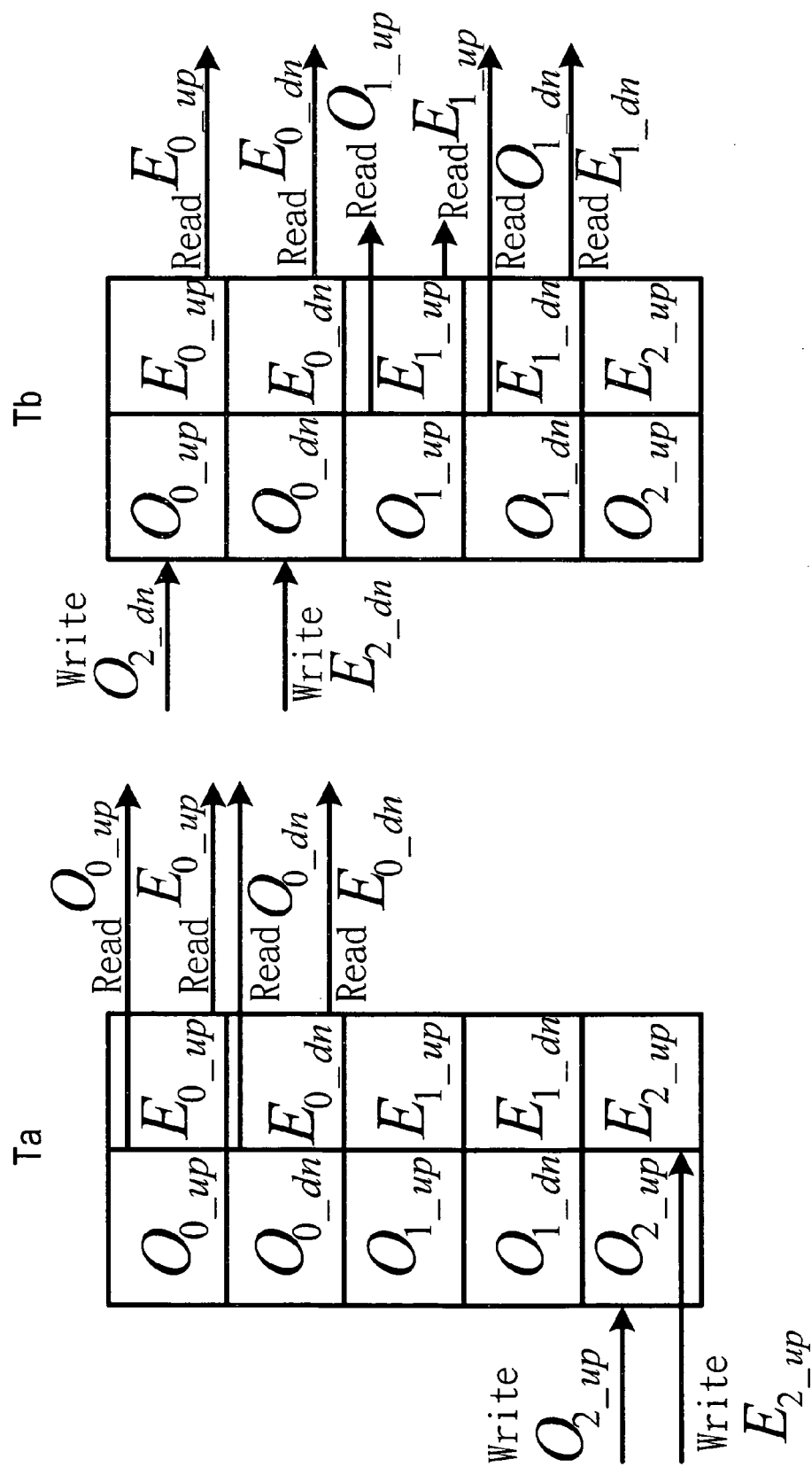
FIG. 15 is a schematic diagram of a buffer operating in different time intervals according to another embodiment of the invention.
Figure 16:
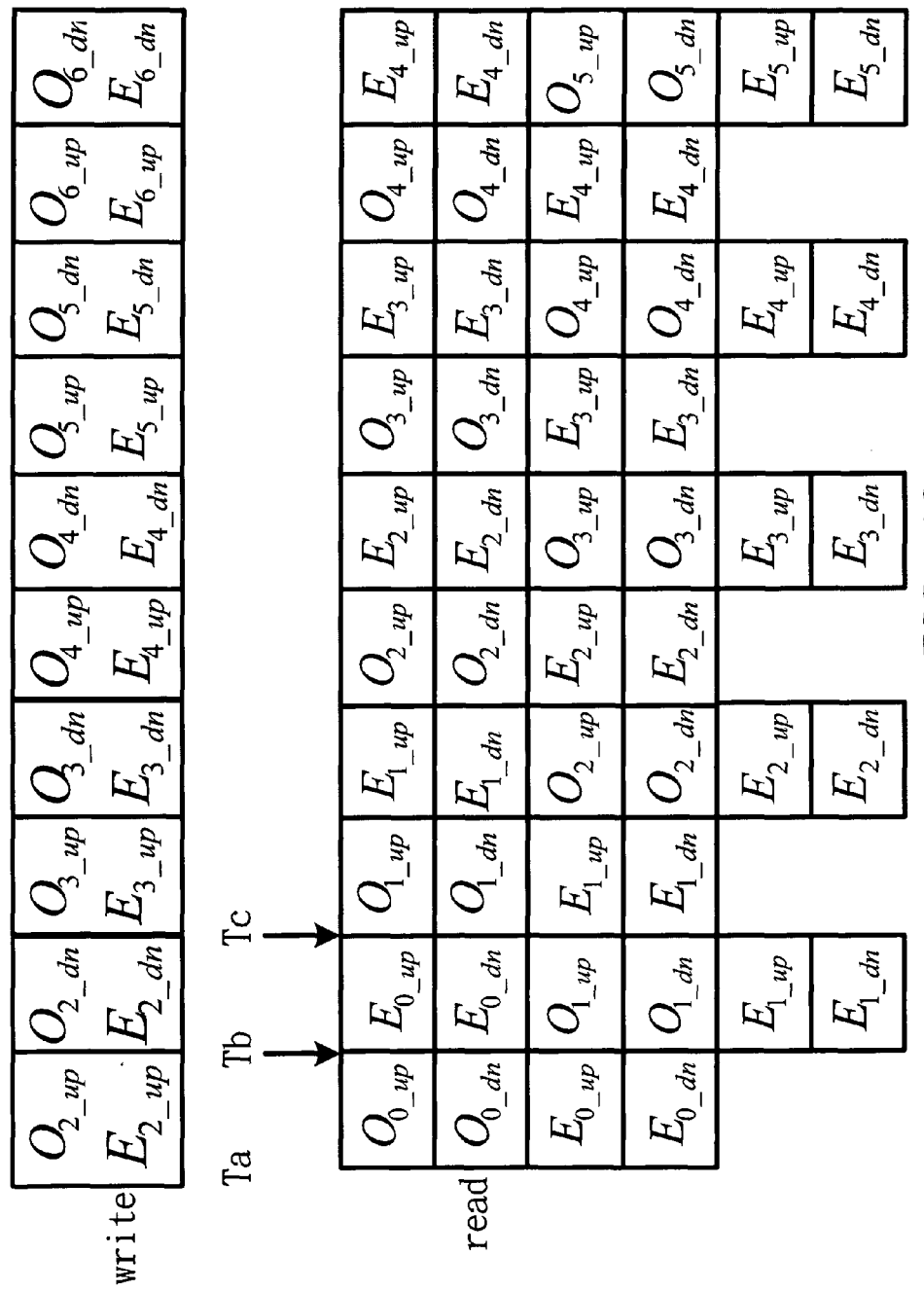
FIG. 16 schematically illustrates a timing of a display frequency boosting system for increasing image display frequency according to another embodiment of the invention.
Figure 17:
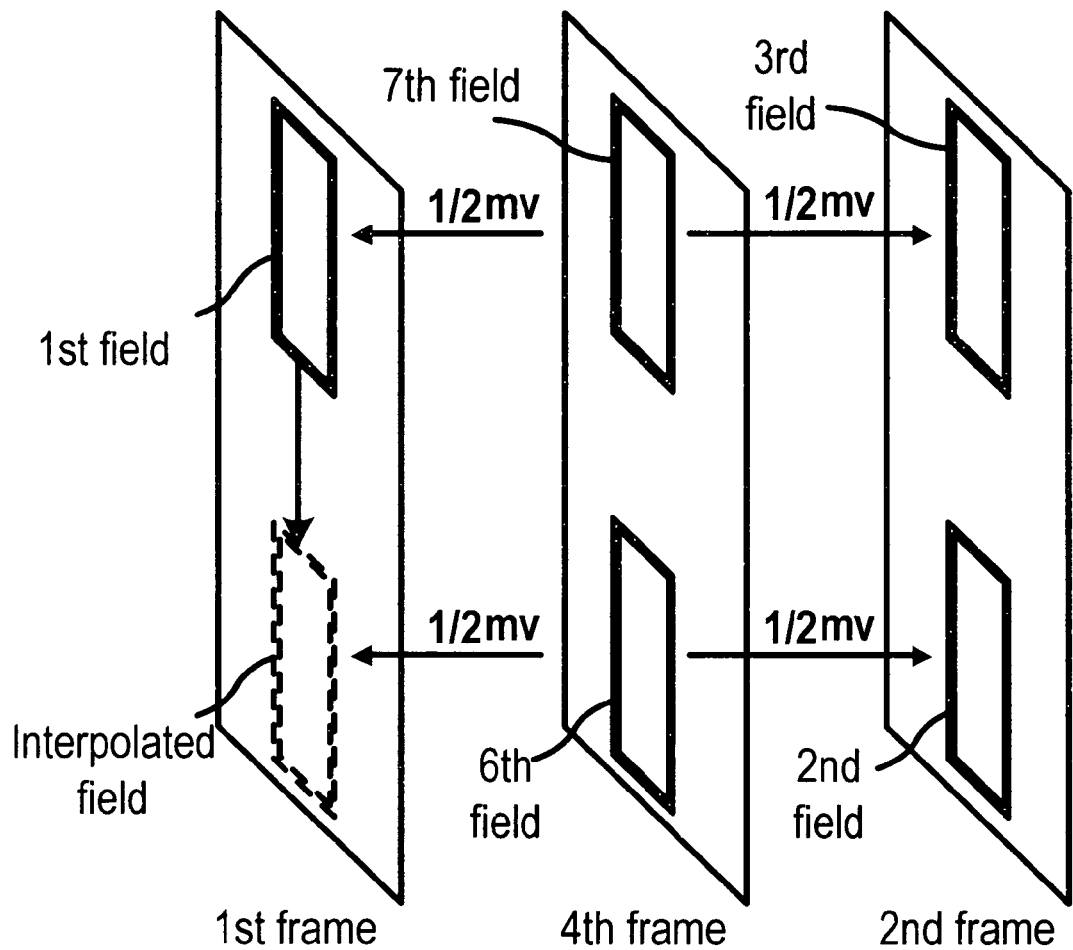
FIG. 17 schematically illustrates the operation of a display frequency boosting system for increasing image display frequency according to another embodiment of the invention.

FIG. 15 is a schematic diagram of the buffer 1410 operating in different time intervals according to another embodiment of the invention. FIG. 16 schematically illustrates a timing of the display frequency boosting system 600 for increasing image display frequency according to another embodiment of the invention. FIG. 17 schematically illustrates the operation of the display frequency boosting system 600 for increasing image display frequency according to another embodiment of the invention.

In a first time interval Ta, the controller 650 controls the buffer 1410 in order to write the first half field $O_{2\_up}$ of the fourth field and the first half field $E_{2\_up}$ of the fifth field in the buffer 1410, read the zero field ($O_{0\_up}$, $O_{0\_dn}$) and the first field ($E_{0\_up}$, $E_{0\_dn}$) out of the buffer 610, and output the first frame corresponding to the zero field and the first field.

In a second time interval Tb, the controller 650 controls the buffer 1410 in order to write the second half field $O_{2\_dn}$ do of the fourth field and the second half field $E_{2\_dn}$ of the fifth field in the buffer 610, and read the first field ($E_{0\_up}$, $E_{0\_dn}$), the second field ($O_{1\_up}$, $O_{1\_dn}$) and the third field ($E_{1\_up}$, $E_{1\_dn}$) out of the buffer 610.

In the second time interval Tb, the motion estimation device 620 performs a motion estimation on the first field ($E_{0\_up}$, $E_{0\_dn}$) and the third field ($E_{1\_up}$, $E_{1\_dn}$) to thereby produce the motion vector MV, and the interpolator 630 performs an interpolation on the first field ($E_{0\_up}$, $E_{0\_dn}$) to thereby produce the interpolated field ($O_{0\_up}$, $O_{0\_dn}$).

In the second time interval Tb, the motion compensation device 640 is based on the motion vector MV, the interpolated field ($O_{0\_up}$, $O_{0\_dn}$) and the second field ($O_{1\_up}$, $O_{1\_dn}$) to perform a motion compensation to thereby produce the sixth field.

In the second time interval Tb, the motion compensation device 640 is based on the motion vector MV, the first field ($E_{0\_up}$, $E_{0\_dn}$) and the third field ($E_{1\_up}$, $E_{1\_dn}$) to perform the motion compensation to thereby produce the seventh field.

As cited, the invention requires only 2.5 frame buffers, which is a half frame less than the prior art. In addition, in the second time interval, the invention requires only reading three fields (1.5 frames) out of the buffer 1410, rather than two frames in the prior art. Thus, the system reading requirement and the system load in the invention are reduced.

Although the present invention has been explained in relation to its preferred embodiment, it is to be understood that many other possible modifications and variations can be made without departing from the spirit and scope of the invention as hereinafter claimed.

What is claimed is:

1. A display frequency boosting system, for increasing image display frequency, comprising:
  a buffer having an input terminal and six field buffers to receive image data from a first frame, a second frame, and a third frame respectively, and store the frames in a form of zero to fifth fields, wherein each of the frames is composed of an odd field and an even field;
  a motion estimation device, connected to the buffer, for performing a motion estimation on the fields to produce a motion vector;
  an interpolator, connected to the buffer, for performing an interpolation on the fields to produce an interpolated field;
  a motion compensation device, connected to the buffer, the motion estimation device and the interpolator, for performing a motion compensation according to the fields stored in the buffer, the interpolated field and the motion vector so as to produce a sixth field and a seventh field; and
  a controller, connected to the buffer, for controlling read and write operations of the buffer, wherein the controller controls the buffer in a first time interval in order to write the fourth field in the buffer, read the zero field and the first field out of the buffer and output the first frame corresponding to the zero field and the first field, and the controller controls the buffer in a second time interval in order to write the fifth field in the buffer and read the zero field, the first field and the second field out of the buffer;
  wherein a fourth frame corresponding to the sixth field and the seventh field locates between the first frame and the second frame in a display time axis;
  wherein the motion estimation device performs the motion estimation on the zero field and the second field in the second time interval to produce the motion vector;
  wherein the interpolator performs the interpolation on the second field in the second time interval to produce the interpolated field; and
  wherein the motion compensation device is based on the motion vector, the zero field and the second field to perform the motion compensation in the second time interval so as to produce the sixth field.

2. The display frequency boosting system as claimed in claim 1, wherein the motion compensation device is based on the motion vector, the first field and the interpolated field to perform the motion compensation in the second time interval so as to produce the seventh field.

3. A display frequency boosting system for increasing image display frequency, comprising:
  a buffer, having an input terminal and ten half field buffers to receive and store image data of first and second frames and partial image data of a third frame, and store the frames in a form of zero to fourth fields, wherein each of the frames is composed of an odd field and an even field, and each of the fields is composed of a first half field and a second half field;
  a motion estimation device, connected to the buffer for performing a motion estimation on the fields to thereby produce a motion vector;
  an interpolator, connected to the buffer for performing an interpolation on the fields to produce an interpolated field;
  a motion compensation device, connected to the buffer, the motion estimation device and the interpolator for performing a motion compensation according to the fields stored in the buffer, the interpolated field and the motion vector to produce a sixth field and a seventh field; and
  a controller, connected to the buffer for controlling read and write operations of the buffer;
  wherein a fourth frame corresponding to the sixth field and the seventh field locates between the first frame and the second frame in a display time axis; and
  wherein the controller controls the buffer in a first time interval in order to write the first half field of the fourth field and the first half field of the fifth field in the buffer, read the zero field and the first field out of the buffer and output the first frame corresponding to the zero field and the first field.

4. The display frequency boosting system as claimed in claim 3, wherein the controller in a second time interval controls the buffer in order to write the first half field of the fourth field and the first half field of the fifth field in the buffer and read the first field, the second field and the third field out of the buffer.

5. The display frequency boosting system as claimed in claim 4, wherein the motion estimation device performs the motion estimation on the first field and the third field in the second time interval to produce the motion vector.

6. The display frequency boosting system as claimed in claim 4, wherein the interpolator performs an interpolation on the first field in the second time interval to produce the interpolated field.

7. The display frequency boosting system as claimed in claim 6, wherein the motion compensation device is based on the motion vector, the interpolated field and the second field in the second time interval to perform the motion compensation so as to produce the sixth field.

8. The display frequency boosting system as claimed in claim 7, wherein the motion compensation device is based on the motion vector, the first field and the third field in the second time interval to perform the motion compensation so as to produce the seventh field.

9. A display frequency boosting system, for increasing image display frequency, comprising:
  a buffer having an input terminal and six field buffers to receive image data from a first frame, a second frame, and a third frame respectively, and store the frames in a form of zero to fifth fields, wherein each of the frames is composed of an odd field and an even field;
  a motion estimation device, connected to the buffer, for performing a motion estimation on the fields to produce a motion vector;
  an interpolator, connected to the buffer, for performing an interpolation on the fields to produce an interpolated field;
  a motion compensation device, connected to the buffer, the motion estimation device and the interpolator, for performing a motion compensation according to the fields stored in the buffer, the interpolated field and the motion vector so as to produce a sixth field and a seventh field; and
  a controller, connected to the buffer, for controlling read and write operations of the buffer;
  wherein a fourth frame corresponding to the sixth field and the seventh field locates between the first frame and the second frame in a display time axis;
  wherein the controller controls the buffer in a first time interval in order to write the fourth field in the buffer, read the zero field and the first field out of the buffer and output the first frame corresponding to the zero field and the first field;
  wherein, in a second time interval, the controller controls the buffer in order to write the fifth field in the buffer and read the first field, the second field and the third field out of the buffer, the motion estimation device performs the motion estimation on the first field and the third field to produce the motion vector, and the interpolator performs the interpolation on the first field to produce the interpolated field.

10. The display frequency boosting system as claimed in claim 9, wherein the motion compensation device is based on the motion vector, the interpolated field and the second field to perform the motion compensation in a second time interval so as to produce the sixth field.

11. The display frequency boosting system as claimed in claim 9, wherein the motion compensation device is based on the motion vector, the first field and the third field to perform the motion compensation in the second time interval so as to produce the seventh field.

* * * * *